March 17, 1953  F. R. HARRIS  2,631,558
MARINE OIL STORAGE TANK
Filed July 31, 1948  2 SHEETS—SHEET 1

FREDERIC R. HARRIS
INVENTOR.

BY *L. C. Goodwin*
ATTORNEY

March 17, 1953     F. R. HARRIS     2,631,558
MARINE OIL STORAGE TANK

Filed July 31, 1948     2 SHEETS—SHEET 2

FREDERIC R. HARRIS
INVENTOR.

BY *L. C. Goodwin*
ATTORNEY

Patented Mar. 17, 1953

2,631,558

UNITED STATES PATENT OFFICE 2,631,558

MARINE OIL STORAGE TANK

Frederic R. Harris, New York, N. Y., assignor to Stanolind Oil and Gas Company, Tulsa, Okla., a corporation of Delaware Application July 31, 1948, Serial No. 41,842

3 Claims. (Cl. 114—.5)

This invention pertains to oil storage tanks and more particularly to oil storage tanks adapted to use in marine areas.

In the storage of oil produced in inundated marine areas, particularly in coastal waters of the United States, the oil must either be piped to tanks on dry land for storage or it must be stored in the water, preferably the water adjacent the well. Generally pipe lines to dry land are impractical—particularly where production is several miles off shore. Accordingly, the oil production from a well must be accumulated near the producing site. The storage of oil at such locations is beset with many hazards such as contamination of the coastal waters and the destructive forces of ocean waves—problems substantially different from those encountered in the storage on land of fluids produced from an oil well. Crude oil lost from a storage tank in these waters may be destructive to marine life and marine vegetation.

Also, due to the extreme forces exerted by waves in these coastal waters, particularly forces exerted on a structure above the mean water level, any structure having an appreciable area subjected to such forces cannot satisfactorily be anchored and avoid destruction by such waves.

It is therefore an object of this invention to provide an oil storage tank for marine locations. A further object of this invention is to provide an oil storage tank for marine locations in which substantially the complete capacity of the tank is below the mean water level. A further object of this invention is to provide a stable buoyant oil storage tank which is adapted to be flexibly anchored in a marine location and to withstand the forces exerted by waves. A still further object of this invention is to provide means to prevent contaminatoin of sea water with fluids produced from a well and stored in a marine tank. These, as well as other objects of this invention, will become apparent as the description thereof proceeds. In this description, references will be made to the drawings in which:

Figure 2:
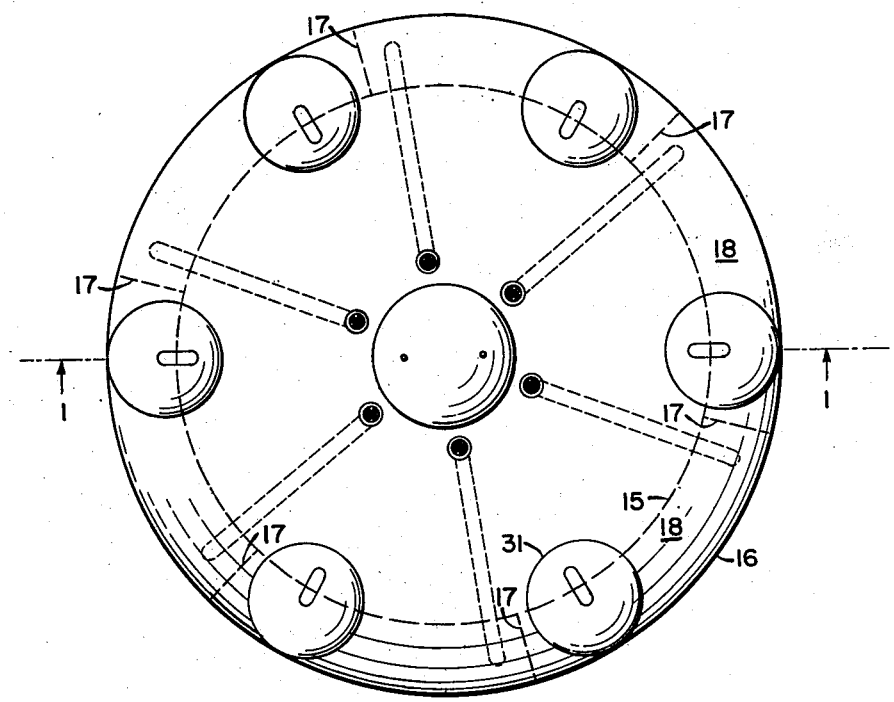
Figure 2 is a plan view of the tank shown in Figure 1.
Figure 1:
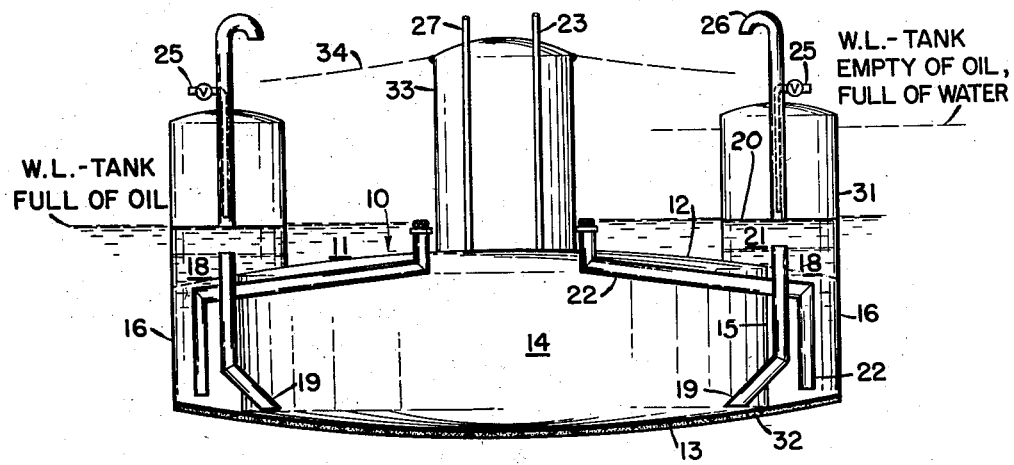
Figure 1 is a cross-sectional view of one embodiment of a buoyant oil storage tank constructed in accordance with this invention.

Referring now to the drawings, in Figure 1 I have shown a storage tank 10 submerged in water 11. This tank is preferably cylindrical in shape as shown in Figure 2, having a deck 12 and bottom 13 which may be in the shape of spherical sections. The oil chamber 14 of tank 10 is surrounded, preferably concentrically, by a shell 16. Radial dividers 17 sub-divide the annulus between the tank wall 15 and the shell 16 into a number of individual separator compartments 18 which have upper decks 20. These compartments are connected with the oil chamber by pipes 19 which connect with the oil chamber at a low point and with the separator compartments at a high point. Thus, during the operation of filling the tank with oil, water from the bottom of the oil chamber 14 is deposited in the top of one or more of the separator compartments 18. In this separator compartment the water, as it is displaced from the oil chamber, is displaced downwardly through any accumulated oil film 21 and enters discharge pipe 22 which takes water from the bottom of this compartment and deposits it in the sea or surrounding water. Thus it will be apparent, assuming the tank has been in operation and is full of sea water, that well fluids entering the oil chamber through the oil filling line 23 tend to displace water downwardly in the chamber and into separator compartments 18 through pipes 19. In this separator compartment a second separation between oil and water is made, the oil tending to accumulate in the upper portion and the water being separated and discharged into the sea. This double separation of oil and water eliminates contamination of the sea water by oil which on only one gravity separation is generally incomplete. An oil draw-off connection 25 is provided in each separator compartment 18 for periodically removing the accumulated oil film from each of these compartments. These draw-off connections may, for example, extend from above water level down to the oil level in vent line 26 as indicated in Figure 1.

Figure 3:
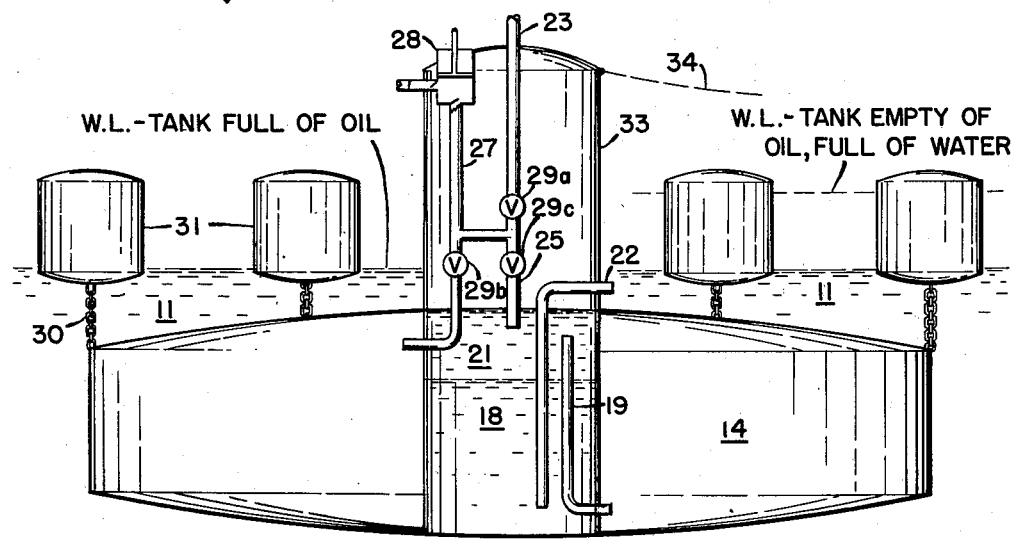
Figure 3 is a cross-sectional view of an alternative embodiment of a buoyant oil storage tank constructed in accordance with this invention.

While these separator compartments may be thus conveniently spaced around the periphery of the oil chamber, one or more separator compartments may be alternatively placed within the oil chamber 14 as indicated in Figure 3. The operation of this embodiment is substantially identical to the operation of the embodiment shown in Figure 1. Oil from a well enters the oil chamber through filling line 23, valves 29a, and 29b displacing water out of the bottom of oil chamber 14 through pipe 19 into the top of separator compartment 18. A second separation between the oil and water is made in this separator, the oil accumulating in a film 21 in the top of the separator and the water settling to the bottom where it is conducted by intake and discharge pipe 22 into, for example, the sea. The accumulated oil film 21 may be periodically withdrawn by pump 28 through valve 29c in draw-off connection 25 which may in this embodiment be connected to the tank outlet 27.

In both embodiments the oil chamber is emptied by connecting, for example, a tanker to tank outlet 27 and displacing oil from the top of the oil chamber into the tanker as, for example, by a pump 28 as shown in Figure 3. As oil is withdrawn from the top of the oil chamber it is replaced by water flowing from the sea through intake and discharge pipe 22, thence upwardly through separator compartment 18 and into the oil chamber through pipe 19. It will be apparent that as the oil chamber is emptied, the oil film 21 in separator compartment 18 if not previously removed through draw-off connection 25 is emptied into the oil chamber where it commingles with the oil and is removed to the tanker.

Buoys 31 which are preferably hermetically sealed are mounted around the periphery of the tank either by rigid connection as shown in Figure 1 or by a flexible connection such as a chain 30 as shown in Figure 3 to stabilize the tank, i. e., maintain it in an upright position, and to supply the buoyancy required to float the tank when the tank is full of water. More particularly the buoys are volumetrically proportioned to provide the difference in buoyancy required to support the tank below the water level both when it is filled with water and when it is filled with oil. The volume within these buoys is naturally dependent upon the volume and weight of the tank, the specific gravity of the oil and the like and must be determined for each installation. The buoys are, however, disposed so that when the tank is completely filled with oil of the gravity which is to be stored, plus ballast if necessary, very little of each of the buoys is submerged. Preferably ballast as, for example, a cement coating 32 on tank bottom 13 is added for a light oil so that the tank is submerged to the depth of the bottom of the buoys as indicated in Figure 1. When oil is displaced from the oil chamber and it becomes filled with water the tank tends to sink but the added buoyancy necessary to prevent sinking is provided by the displacement of buoys 31.

Figure 4:
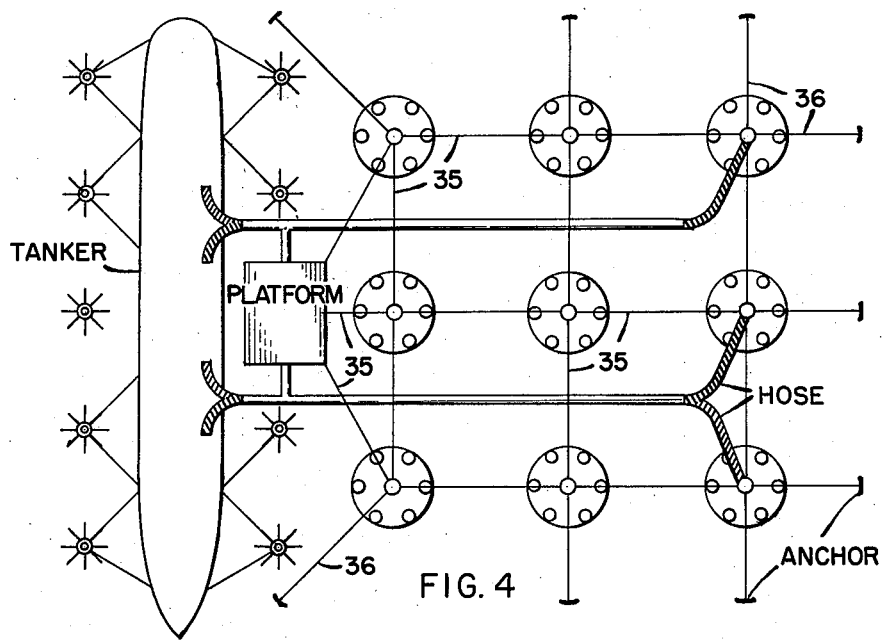
Figure 4 is a diagrammatic illustration of a marine tank battery in accordance with this invention.

A tower 33, preferably located on the axis of the tank, provides access to the oil chamber 14 and also provides space for oil filling line 23 and tank outlet 27. Guys 34 (preferably 3 or more flexible cables or chains) are connected to this tower 33 near the top. The other end of the guys may be anchored or otherwise connected to a dolphin for holding the tank in a substantially permanent location. Where a battery of tanks is required, towers of a number of tanks may be connected together as shown in Figure 4. Thus, intermediate guys 35 may be connected between the towers of a number of tanks and guys 36 are extended to dolphins or are otherwise anchored as in the case of a single tank.

From the above description, it will be apparent that a marine tank of the type described is adapted to withstand storms, hurricanes and the like since the area exposed to the high velocity waves above mean water level is relatively small. Furthermore, the major proportion of the cross-sectional area of the tank is always submerged to a depth where the velocity of the waves is moderate even in high winds. The submerged tank anchored as shown and supported by guys from the buoys is always stable and free to swing away from wave impact, the effect of which is therefore substantially reduced. It will also be apparent that this invention is subject to a number of modifications without departing from the spirit thereof. For example, reference has for convenience been made for illustrative purposes to the tank as an oil storage tank. Obviously, the tank is not limited to the storage of oil. I do not wish therefore to be limited by the description of specific embodiments presented for purposes of explanation and illustration. The invention is instead defined only by the appended claims.

I claim:

1. A submersible oil storage apparatus comprising a flat cylindrical tank, a concentric partition means within said tank defining an oil storage chamber and an oil-water separation chamber, conduit means extending between a low point in said storage chamber and a relatively high point in said separation chamber, a second conduit means extending between a low point in said separation chamber and a point exterior of said storage chamber, a third conduit means for introducing oil to said storage chamber, a fourth conduit means for withdrawing oil from said storage chamber, a tank well extending from the upper deck of said storage tank, said third and fourth conduit means extending within the said tank well, skimming means connected to said separation chamber for withdrawing separated oil from an upper portion of said separation chamber and buoyant means attached to and acting uniformly on said submersible storage tank to stabilize and support said tank below the surface of the water.

2. In a flat, cylindrical, submersible oil-storage tank, a concentric partition means defining an oil storage chamber and an oil-water separation chamber, a first conduit means extending between a low point in said storage chamber and a relatively high point in said separation chamber, a second conduit means extending between a low point in said separation chamber and a point exterior of said storage chamber, additional conduit means for introducing and withdrawing oil from said storage chamber, a tank well extending from the upper deck of said storage tank, said additional conduit means extending within said tank well, skimming means connected to said separation chamber for withdrawing separated oil from an upper portion of said separation chamber, and buoyant means attached to and acting uniformly on said submersible storage tank to stabilize and support said tank below the surface of the water.

3. In a submersible tank having an upper deck for storing oil under water in a marine area, partition means defining an oil-storage chamber and an oil-separation chamber, a first conduit means extending between a low point in said storage chamber and a relatively high point in said separation chamber, a second conduit means extending between a low point in said separation chamber and a point exterior of said tank, a tank well extending from the upper deck of said storage chamber to an elevation above the level of said water, additional conduit means for introducing oil into and withdrawing oil from said storage chamber, said additional conduit means being maintained out of water by said tank well to facilitate filling and emptying said tank, skimming means connected to said separation chamber for withdrawing separated oil from an upper portion of said separation chamber, and buoy means attached to and acting uniformly on said tank to stabilize and support it below the surface of said water.

FREDERIC R. HARRIS.

REFERENCES CITED

The following references are of record in the file of this patent:

UNITED STATES PATENTS

| Number | Name | Date |
|---|---|---|
| 636,076 | Smith | Oct. 31, 1899 |
| 835,216 | Crozier | Nov. 6, 1906 |
| 1,176,526 | Doxford | Mar. 21, 1916 |
| 1,219,115 | Laurenti | Mar. 13, 1917 |
| 1,220,825 | Funga-Giera | Mar. 27, 1917 |
| 1,494,906 | Haynes | May 20, 1924 |
| 1,495,529 | Reno | May 27, 1924 |
| 1,710,006 | Peter | Apr. 23, 1929 |
| 1,759,644 | Reed-Hill | May 20, 1930 |
| 2,402,790 | Vorenkamp | June 25, 1946 |
| 2,422,555 | Karlson et al. | June 17, 1947 |

FOREIGN PATENTS

| Number | Country | Date |
|---|---|---|
| 346,114 | Germany | Dec. 24, 1921 |